US012688731B2

(12) United States Patent
Kolla et al.

(10) Patent No.: US 12,688,731 B2
(45) Date of Patent: Jul. 21, 2026

(54) METHOD AND SYSTEM FOR DETECTION OF A FRAUDULENT ACTION USING FACE DATABASE SEARCH AND RETRIEVAL

(71) Applicant: HYPERVERGE INC., Irving, TX (US)

(72) Inventors: Manideep Kolla, Nellore (IN); Ayush Pandey, Mumbai (IN); Aravinth Muthu, Ganapathy (IN); Hariprasad P S, West Mambalam (IN); Vignesh Krishnakumar, Chennai (IN)

(73) Assignee: HYPERVERGE INC., Irving, TX (US)

( * ) Notice: Subject to any disclaimer, the term of this patent is extended or adjusted under 35 U.S.C. 154(b) by 648 days.

(21) Appl. No.: 18/336,504

(22) Filed: Jun. 16, 2023

(65) Prior Publication Data

US 2024/0185635 A1     Jun. 6, 2024

Related U.S. Application Data

(60) Provisional application No. 63/430,281, filed on Dec. 5, 2022.

(51) Int. Cl.
| | |
|---|---|
| *G06V 40/16* | (2022.01) |
| *G06V 10/24* | (2022.01) |
| *G06V 10/25* | (2022.01) |
| *G06V 10/82* | (2022.01) |

(52) U.S. Cl.
CPC ............ *G06V 40/179* (2022.01); *G06V 10/24* (2022.01); *G06V 10/25* (2022.01); *G06V*

*10/82* (2022.01); *G06V 40/171* (2022.01); *G06V 40/172* (2022.01)

(58) Field of Classification Search
CPC ........ G06V 10/24; G06V 10/25; G06V 10/82; G06V 40/171; G06V 40/172; G06V 40/179; G06V 40/40
See application file for complete search history.

(56) References Cited

U.S. PATENT DOCUMENTS

2022/0270423 A1*   8/2022   Gelfand ............. G06Q 30/0609

* cited by examiner

*Primary Examiner* — Michael J Vanchy, Jr.
(74) *Attorney, Agent, or Firm* — Ladas & Parry, LLP

(57) ABSTRACT

A system and method for detection of a fraudulent action using face database search and retrieval is given. The method identifies fraudulent action using a combination of images captured in real-time, feature vector extraction, and metadata matching. The method involves capturing, a query selfie image and a query ID card image. Thereafter, face feature vectors from the query images are extracted, and candidate face feature vectors are identified by searching a set of nearest neighbors of the extracted face feature vectors. The method then retrieves pre-stored application IDs associated with the candidate face feature vectors and a pre-stored metadata associated with the candidate face feature vectors. The method then matches the query metadata with the pre-stored metadata and generates either a fraudulent or non-fraudulent indication based on the matching. Thereafter it detects a fraudulent activity based on the fraudulent indication.

29 Claims, 5 Drawing Sheets

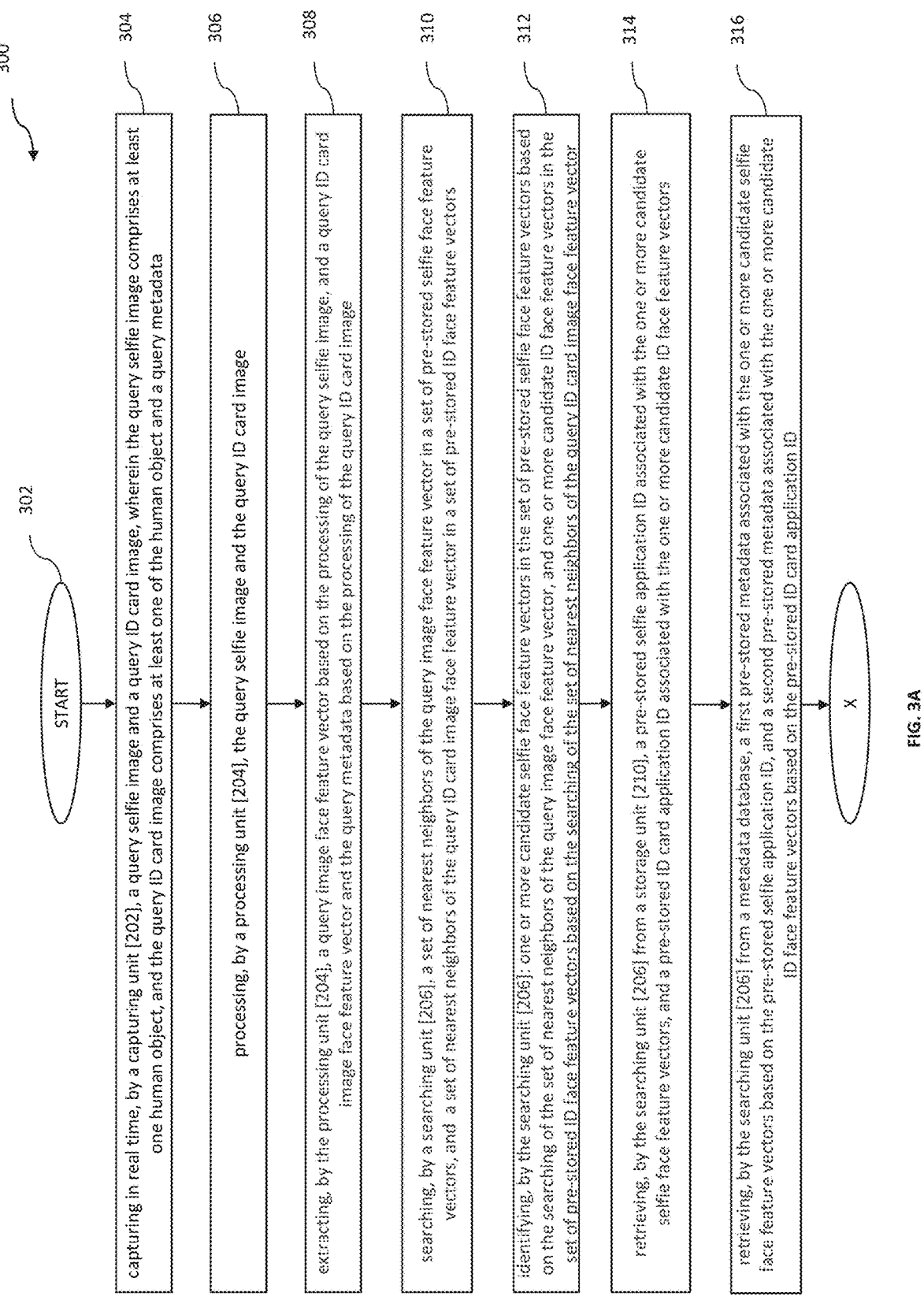

300

302 START 304 capturing in real time, by a capturing unit [202], a query selfie image and a query ID card image, wherein the query selfie image comprises at least one human object, and the query ID card image comprises at least one of the human object and a query metadata 306 processing, by a processing unit [204], the query selfie image and the query ID card image 308 extracting, by the processing unit [204], a query image face feature vector based on the processing of the query selfie image, and a query ID card image face feature vector and the query metadata based on the processing of the query ID card image 310 searching, by a searching unit [206], a set of nearest neighbors of the query image face feature vector in a set of pre-stored selfie face feature vectors, and a set of nearest neighbors of the query ID card image face feature vector in a set of pre-stored ID face feature vectors 312 identifying, by the searching unit [206], one or more candidate selfie face feature vectors in the set of pre-stored selfie face feature vectors based on the searching of the set of nearest neighbors of the query image face feature vector, and one or more candidate ID face feature vectors in the set of pre-stored ID face feature vectors based on the searching of the set of nearest neighbors of the query ID card image face feature vector 314 retrieving, by the searching unit [206] from a storage unit [210], a pre-stored selfie application ID associated with the one or more candidate selfie face feature vectors, and a pre-stored ID card application ID associated with the one or more candidate ID face feature vectors 316 retrieving, by the searching unit [206] from a metadata database, a first pre-stored metadata associated with the one or more candidate selfie face feature vectors based on the pre-stored selfie application ID, and a second pre-stored metadata associated with the one or more candidate ID face feature vectors based on the pre-stored ID card application ID

METHOD AND SYSTEM FOR DETECTION OF A FRAUDULENT ACTION USING FACE DATABASE SEARCH AND RETRIEVAL

CROSS-REFERENCE TO RELATED APPLICATION

This application is the U.S. Non-Provisional application which claims benefit of and priority to the U.S. Provisional application No. 63/430,281 filed on Dec. 5, 2022, the disclosure of which is incorporated herein by reference in its entirety.

FIELD OF THE INVENTION

The present disclosure generally relates to the technical field of fraud detection. More particularly, the present disclosure relates to methods and systems for identifying fraudulent actions using face database search and retrieval.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today's society has seen an increase in the prevalence of identity fraud. Common forms of identification are now simpler to manipulate digitally as more people move into the electronic age. For instance, there are increasing number of instances where identity fraud has been done by swapping a face of a person on an ID card, or by printing a fake look-a-like ID card by an impersonator. It is no longer secure to confirm someone's true identity by asking only for a copy of their passport or driver license or other form of photo identification. The quality of computers, scanners, and printers is increasing, but so are fake forms of identification documents or identification media. Even trained professionals are sometimes unable to distinguish between a fake and a real form of identification media due to the sophistication of fraudulent identification. Even less training is typically provided to average customer service personnel in recognizing authentic identification media from counterfeit media.

Further, currently, identity fraud is a much more serious issue than ever before, and with the increasing availability of sophisticated technology, it is becoming easier for criminals to create fake forms of identification media. This can be a particular problem for businesses that rely on identity verification to prevent fraud, such as banks, financial institutions, and online merchants etc.

Identification of any fraudulent action related to an image of a user and an image of an ID card of the user is generally performed to identify and/or mitigate various frauds. One major fraud problem is that fraudsters create multiple fake identities of themselves (such as a same face but other details like ID number, name, address may be all different on different identification documents). In such scenarios, even manual human verification of all incoming applications with true or fake identification documents can be difficult/near impossible to stop such fraud cases. To deal with such problems a number of solutions have been developed, however these solutions are not efficient and there are several limitations of these solutions. More specifically, the existing solutions are not efficient as they fail to take into account capturing identity cards and extracting facial biometrics from the captured identity cards for fraud detection. Also, enrolment of ID card faces into a database is absent in most solutions. In the existing solutions searching of ID card faces from an ID database is also absent which is necessary to further improve recall. In addition, none of the existing solutions extract and use metadata from ID cards which is needed to check for suspicious re-entries in a database. Moreover, none of the existing methods perform both user image face (for instance selfie face) based retrieval and ID card face based retrieval and combine the results to arrive at a final decision.

Therefore, there are a number of limitations to the existing solutions and in order to overcome these and such other limitations of the known solutions it is necessary to provide an efficient solution for detection of a fraudulent action.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide a solution that can perform both user image face-based retrieval and ID card face based retrieval and combine the results to efficiently detect a fraudulent action.

Another object of the present disclosure is to catch repeat fraudsters who are trying to dupe the system by creating multiple identification cards with a same image but different meta details.

Yet another object of the present invention is to provide methods and systems for detection of a fraudulent action using face database search and retrieval.

Yet another object of the present invention is to provide methods and systems for detection of a fraudulent action based at least on a metadata associated with one or more images and one or more ID cards associated with the one or more images.

Yet another object of the present invention is to provide methods and systems for identification of fraud based on matching of a metadata of the image of the user and/or the ID card of the user with one or more pre-stored metadata files.

Furthermore, in order to achieve the aforementioned objectives, the present invention provides a method and system for detection of a fraudulent action using database search (for e.g., a face database search) and retrieval.

A first aspect of the present invention relates to the method for detection of a fraudulent action. The method encompasses capturing in real time, by a capturing unit, a query selfie image and a query ID card image, wherein the query selfie image comprises a human object, and the query ID card image comprises at least one of the human object and a query metadata. Further, the method comprises processing, by a processing unit, the query selfie image and the query ID card image. The method further comprises extracting, by the processing unit, a query image face feature vector based on the processing of the query selfie image, and a query ID card image face feature vector and the query metadata based on the processing of the query ID card image. Further, the method comprises searching, by a searching unit, a set of nearest neighbors of the query image face feature vector in a set of pre-stored selfie face feature vectors, and a set of nearest neighbors of the query ID card image face feature vector in a set of pre-stored ID face feature vectors. Further, the method encompasses identifying, by the searching unit one or more candidate selfie face feature vectors in the set of pre-stored selfie face feature vectors based on the searching of the set of nearest neighbors of the query image face feature vector, and identifying, by the searching unit one or more candidate ID face feature vectors in the set of pre-stored ID face feature vectors based on the searching of the set of nearest neighbors of the query ID card image face feature vector. The method further comprises retrieving, by the searching unit from a storage unit, a pre-stored selfie application ID associated with the one or more candidate selfie face feature vectors, and a pre-stored ID card application ID associated with the one or more candidate ID face feature vectors. Further, the method comprises retrieving, by the searching unit from a metadata database, a first pre-stored metadata associated with the one or more candidate selfie face feature vectors based on the pre-stored selfie application ID, and a second pre-stored metadata associated with the one or more candidate ID face feature vectors based on the pre-stored ID card application ID. Further, the method comprises matching, by a decision-making unit, the query metadata with at least one of the first pre-stored metadata and the second pre-stored metadata. The method further comprises generating, by the decision-making unit, one of a fraudulent indication and a non-fraudulent indication based on the matching of the query metadata with at least one of the first pre-stored metadata and the second pre-stored metadata. Thereafter, the method comprises detecting, by the decision-making unit, the fraudulent action based on the fraudulent indication.

Another aspect of the present invention relates to a system for detection of a fraudulent action. The system comprises a capturing unit, configured to capture a query selfie image and a query ID card image, wherein the query selfie image comprises a human object, and the query ID card image comprises at least one of the human object and a query metadata. The system further comprises a processing unit connected at least to the capturing unit, wherein the processing unit is configured to process the query selfie image and the query ID card image. The processing unit is further configured to extract a query image face feature vector based on the processing of the query selfie image, and a query ID card image face feature vector and the query metadata based on the processing of the query ID card image. The system further encompasses a searching unit connected at least to the capturing unit and the processing unit, wherein the searching unit is configured to search a set of nearest neighbors of the query image face feature vector in a set of pre-stored selfie face feature vectors, and a set of nearest neighbors of the query ID card image face feature vector in a set of pre-stored ID face feature vectors. The said searching unit is further configured to identify one or more candidate selfie face feature vectors in the set of pre-stored selfie face feature vectors based on the searching of the set of nearest neighbors of the query image face feature vector. Furthermore, the searching unit is also configured to identify one or more candidate ID face feature vectors in the set of pre-stored ID face feature vectors based on the searching of the set of nearest neighbors of the query ID card image face feature vector. Furthermore, the searching unit is configured to retrieve from a storage unit, a pre-stored selfie application ID associated with the one or more candidate selfie face feature vectors, and a pre-stored ID card application ID associated with the one or more candidate ID face feature vectors. Further, the searching unit is configured to retrieve from a metadata database a first pre-stored metadata associated with the one or more candidate selfie face feature vectors based on the pre-stored selfie application ID, and retrieve from the metadata database a second pre-stored metadata associated with the one or more candidate ID face feature vectors based on the pre-stored ID card application ID. The system further comprises a decision-making unit connected at least to the capturing unit, the processing unit, and the searching unit, wherein the decision-making unit is configured to match the query metadata with at least one of the first pre-stored metadata and the second pre-stored metadata. Further, the decision-making unit is configured to generate one of a fraudulent indication and a non-fraudulent indication based on the matching of the query metadata with at least one of the first pre-stored metadata and the second pre-stored metadata. Thereafter, the decision-making unit is configured to detect the fraudulent action based on the fraudulent indication.

Yet another aspect of the present invention relates to a non-transitory computer readable storage medium storing instructions for detection of a fraudulent action, the storage medium comprising executable code which, when executed by a processor, causes the processor to: enable a capturing unit to capture a query selfie image and a query ID card image, wherein the query selfie image comprises a human object, and the query ID card image comprises at least one of the human object and a query metadata; process the query selfie image and the query ID card image; extract a query image face feature vector based on the processing of the query selfie image, and a query ID card image face feature vector and the query metadata based on the processing of the query ID card image; enable a searching unit to: 1) search a set of nearest neighbors of the query image face feature vector in a set of pre-stored selfie face feature vectors, and a set of nearest neighbors of the query ID card image face feature vector in a set of pre-stored ID face feature vectors, 2) identify one or more candidate selfie face feature vectors in the set of pre-stored selfie face feature vectors based on the searching of the set of nearest neighbors of the query image face feature vector, 3) identify one or more candidate ID face feature vectors in the set of pre-stored ID face feature vectors based on the searching of the set of nearest neighbors of the query ID card image face feature vector, 4) retrieve from a storage unit, a pre-stored selfie application ID associated with the one or more candidate selfie face feature vectors, and a pre-stored ID card application ID associated with the one or more candidate ID face feature vectors, 5) retrieve from a metadata database a first pre-stored metadata associated with the one or more candidate selfie face feature vectors based on the pre-stored selfie application ID, and 6) retrieve from the metadata database a second pre-stored metadata associated with the one or more candidate ID face feature vectors based on the pre-stored ID card application ID; and enable a decision making unit to: 1) match the query metadata with at least one of the first pre-stored metadata and the second pre-stored metadata, 2) generate one of a fraudulent indication and a non-fraudulent indication based on the matching of the query metadata with at least one of the first pre-stored metadata and the second pre-stored metadata, and 3) detect the fraudulent action based on the fraudulent indication.

BRIEF DESCRIPTION OF DRAWINGS

The accompanying drawings, which are incorporated herein, constitute a part of this disclosure. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components. Although exemplary connections between sub-components have been shown in the accompanying drawings, it will be appreciated by those skilled in the art, that other connections may also be possible, without departing from the scope of the invention. All sub-components within a component may be connected to each other, unless otherwise indicated.

FIG. 3A and FIG. 3B illustrate an exemplary method flow diagram for detection of a fraudulent action, in accordance with exemplary embodiments of the present invention.

Figure 1:
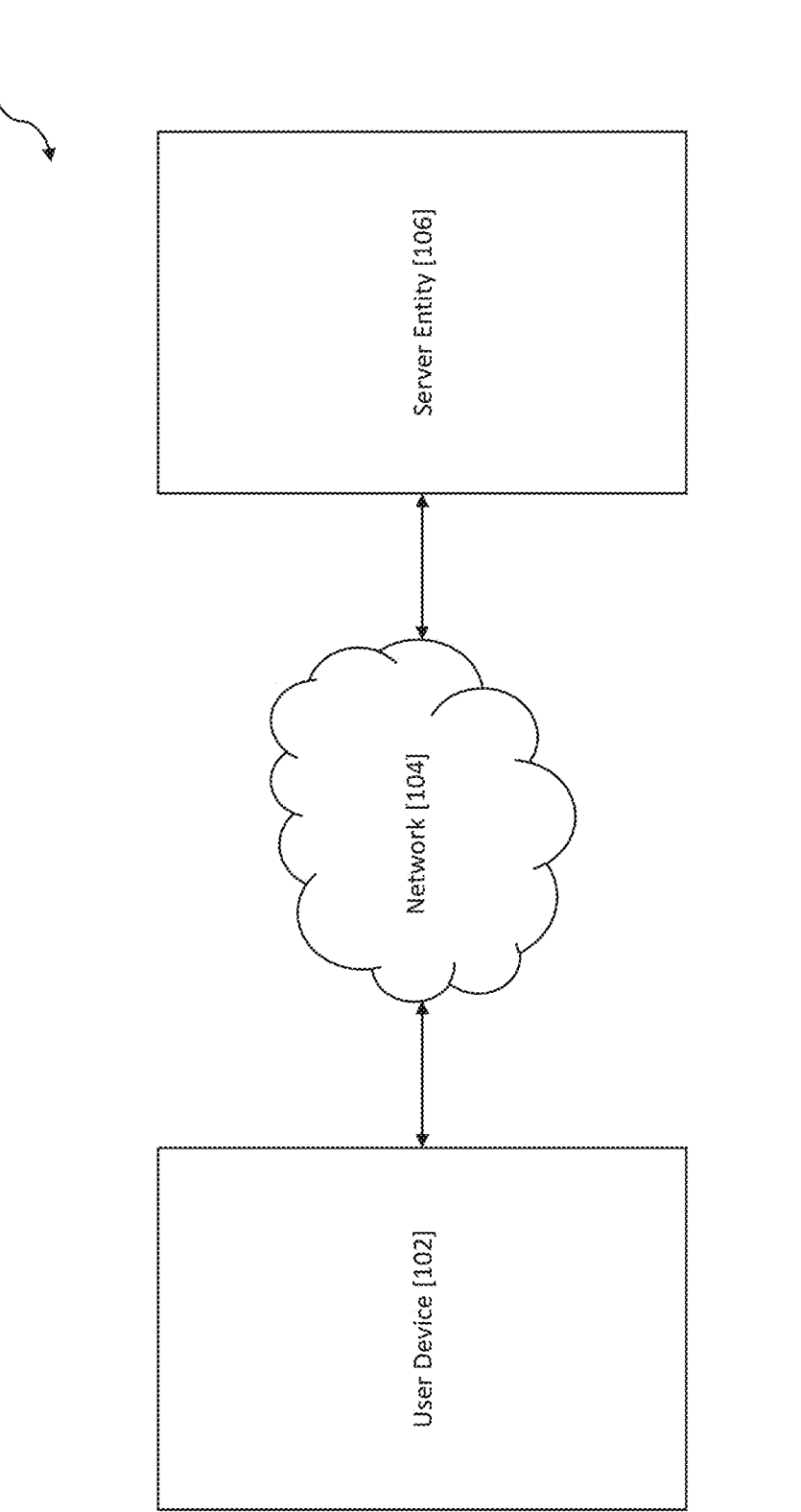
FIG. 1 illustrates an exemplary block diagram depicting an exemplary network architecture diagram [100], in accordance with an embodiment of the present disclosure.

The foregoing shall be more apparent from a more detailed description of the invention below.

DETAILED DESCRIPTION OF THE DISCLOSURE

In the following description, for the purposes of explanation, various specific details are set forth in order to provide a thorough understanding of the embodiments of the present invention. It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present invention are described below, as illustrated in various drawings.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In order to at least overcome the shortcomings of the stated prior art the present invention relates to a novel method and system for the detection of fraudulent actions using face database search and retrieval. The method and system involve capturing a query selfie image and a query ID card image in real-time using a capturing unit. The query selfie image and the query ID card image are processed by a processing unit to extract from a database may be referred to herein as the face database, a query image face feature vector and a query ID card image face feature vector, along with a query metadata. A searching unit then searches for a set of nearest neighbors of the query image face feature vector and the query ID card image face feature vector in a set of pre-stored selfie face feature vectors and a set of pre-stored ID face feature vectors, respectively. The system identifies one or more candidate selfie face feature vectors and one or more candidate ID face feature vectors and retrieves a pre-stored selfie application ID and a pre-stored ID card application ID associated respectively with the one or more candidate selfie face feature vectors and the one or more candidate ID face feature vectors. Furthermore, the system retrieves at least a first pre-stored metadata and a second pre-stored metadata associated respectively with the candidate selfie face feature vector(s) and the candidate ID face feature vector(s) from a metadata database. A decision-making unit of the system then matches the query metadata with at least one of the retrieved first pre-stored metadata and the second pre-stored metadata, and then generates a fraudulent indication or a non-fraudulent indication based on the matching. The fraudulent action is then detected based on the fraudulent indication generated by the decision-making unit.

As used herein, a "processing unit" or "processor" or "operating processor" includes one or more processors, wherein processor refers to any logic circuitry for processing instructions. A processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, a graphics processing unit etc. The processor may perform signal coding data processing, input/output processing, and/or any other functionality that enables the working of the system according to the present disclosure. More specifically, the processor or processing unit is a hardware processor.

As used herein, "storage unit" or "memory unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The storage unit stores at least the data that may be required by one or more units of the server/system/user device to perform their respective functions.

As used herein, "a user equipment", "a user device", "a smart-user-device", "a smart-device", "an electronic device", "a mobile device", "a handheld device", may be any electrical, electronic and/or computing device or equipment, capable of implementing the features of the present disclosure. The user equipment/device may include, but is not limited to, a mobile phone, smart phone, laptop, a general-purpose computer, desktop, personal digital assistant, tablet computer, wearable device or any other computing device which is capable of implementing the features of the present disclosure. Also, the user device may contain at least one input means configured to receive an input from a processing unit, a transceiver unit, a storage unit and any other such unit(s) which are required to implement the features of the present disclosure. Also, "a wireless communication device", "a mobile communication device", "a communication device" or "a communication means" may form a part of the user device as well as the system, for example, the communication means comprising the transceiver units, antennae, along with other components may be present in both the user device and the system of the present disclosure.

As used herein, a "user interface" typically includes an output device in the form of a display, such as a liquid crystal display (LCD), cathode ray tube (CRT) monitors, light emitting diode (LED) screens, etc. and/or one or more input devices such as touchpads or touchscreens. The display may be a part of a portable electronic device such as smartphones, tablets, mobile phones, wearable devices, etc. They also include monitors or LED/LCD screens, television screens, etc. that may not be portable. The display is typically configured to provide visual information such as text and graphics. An input device is typically configured to perform operations such as issuing commands, selecting, and moving a cursor or selector in an electronic device.

The term "metadata" as used in the present disclosure is not intended to be limiting and is meant to encompass any type of data or information that may be associated with the query ID card image, including but not limited to biographical information, document expiration dates, issue dates, and any other relevant information that may be useful for detecting fraudulent actions. The use of the term "metadata" is for descriptive purposes only and is not intended to restrict the scope of the invention.

It is to be understood that the terms 'ID card,' 'ID,' 'identification document', and 'identification card' are used interchangeably throughout this specification to refer to a document or a media file (for e.g., an image file) that identifies an individual. The use of any one of these terms is not intended to limit the scope of the invention, and it should be appreciated by a person skilled in the art that these terms are used synonymously. Therefore, any reference to an 'ID card,' 'ID,' or 'identification card' in this specification should be construed as including all equivalent documents and is not limiting in nature.

It is hereby stated that the terms "user equipment," "standalone device," "kiosk," and "specialized device" used in the present disclosure are not intended to be limiting in nature. These terms are used interchangeably to describe devices that can be used by a user to perform the actions described in the present disclosure, but other devices or systems with similar functionalities may also be used. The person skilled in the art would appreciate that the scope of the invention is not limited to the specific examples provided and can include other devices and systems that perform the same or similar functions.

The present disclosure is further explained in detail below with reference now to the diagrams.

Referring to FIG. 1, the FIG. 1 illustrates an exemplary block diagram depicting an exemplary network architecture diagram [100], in accordance with exemplary embodiments of the present disclosure. As shown in FIG. 1, the exemplary network architecture diagram [100] comprises at least one user equipment [102] connected to at least one server entity [106] via at least one network [104], wherein in an implementation the server entity [106] further comprises a system [200] configured to implement the feature of the present invention. Also, in an implementation the system [200] may reside in the server entity [106] or the user device [102] or both or partially in either the server entity [106] or the user device [102] as obvious to a person skilled in the art to implement the features of the present disclosure.

Also, in FIG. 1 only the single user equipment (or may be referred to as user device) [102], the single network [104] and the single server entity [106] are shown, however, there may be multiple such user equipment [102], server entities [106], and/or networks [104] or there may be any such numbers of said user equipment [102], server entities [106] and/or networks [104] that are obvious to a person skilled in the art or as required to implement the features of the present disclosure. Further, in the implementation where the system [200] is present in the server entity [106], based on the implementation of the features of the present disclosure, a fraudulent action may be detected by the system [200] for a selfie image and an ID card image captured on the user equipment [102].

Figure 2:
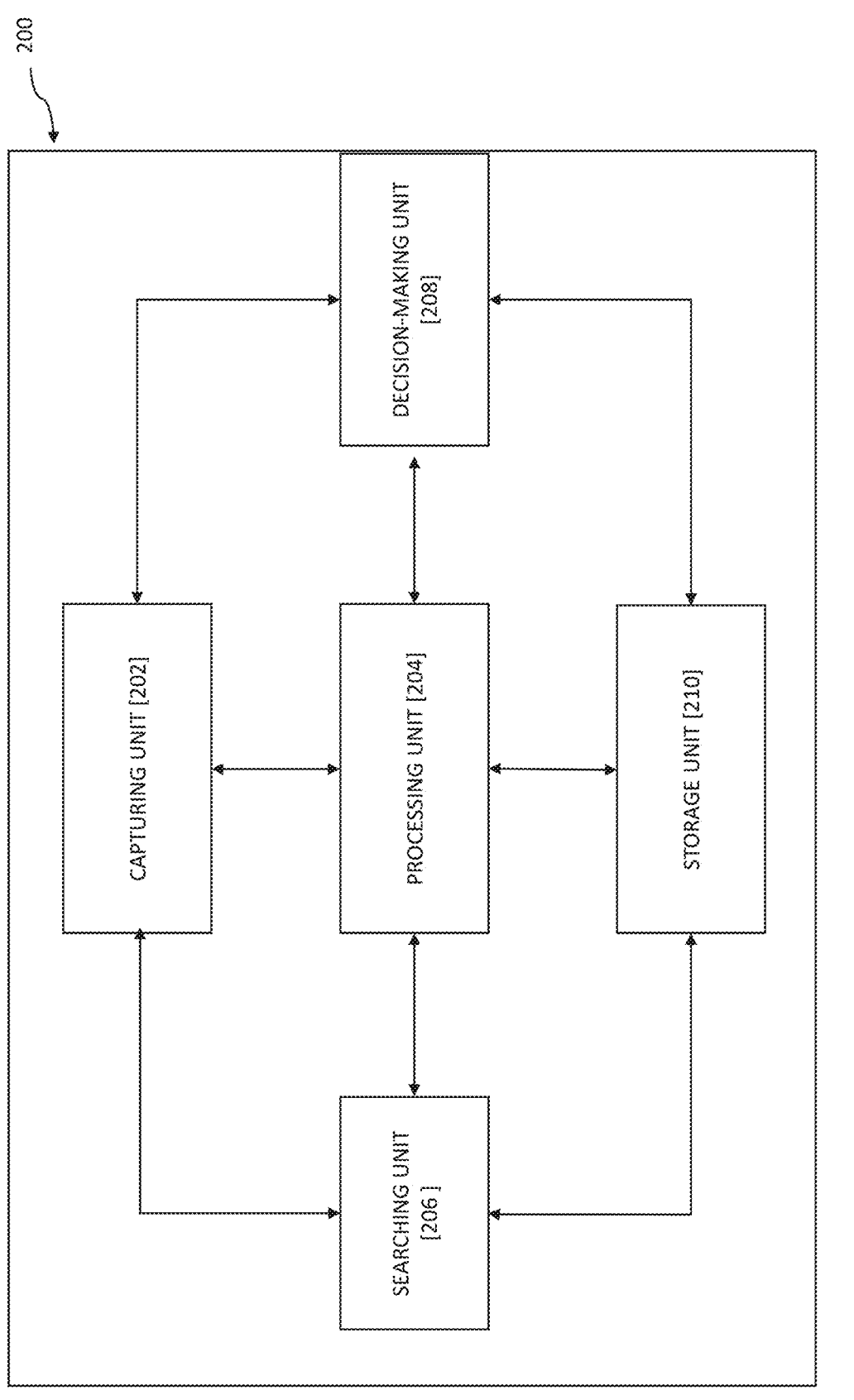
FIG. 2 illustrates an exemplary system diagram for detection of a fraudulent action, in accordance with exemplary embodiments of the present invention.

Referring now to FIG. 2, an exemplary system [200] diagram for detection of a fraudulent action, in accordance with exemplary embodiments of the present invention is shown.

The system [200] encompasses at least one capturing unit [202], at least one processing unit [204], at least one searching unit [206], at least one decision-making unit [208] and at least one storage unit [210]. All of these components/units of the system [200] are assumed to be connected to each other unless otherwise indicated below, and working in conjunction to achieve the objectives of the present invention. While only a few exemplary units are shown in FIG. 2, it may be understood that the system [200] may comprise multiple such units or the system [200] may comprise any such numbers of the units performing functionalities of the present disclosure, that are obvious to a person skilled in the art or as required to implement the features of the present disclosure. Also, in some implementations, some of the components of the system [200] may be distributed in different devices/systems [200].

In an implantation the system [200] may be implemented within a user equipment, or within a standalone device such as a kiosk or a specialized device.

In order to detect a fraudulent action, firstly, the capturing unit [202] is configured to capture a query selfie image and a query ID card image, wherein the query selfie image comprises a human object, and the query ID card image comprises at least one of the human object and a query metadata. In an implementation of the present invention, the capturing unit [202] may be a part of the user device or the kiosk, or the capturing unit [202] may be in a wired and/or wireless connection with the user device or the kiosk, wherein the user device or the kiosk comprises a camera unit comprising at least one camera to capture the query selfie image and the query ID card image. For ease of understanding, let us consider an example wherein a user of a mobile device captures by the mobile device a selfie image and an image of an ID card of the user, i.e., the query selfie image and the query ID card image. The selfie image captured by the mobile device at least comprises a human object e.g., a face of the user, and the image of the ID card captured by the mobile device at least comprises the human object (e.g., the face of the user) and a query metadata such as name, date of birth, address, unique identification number, etc.

Also, in an implementation, the capturing unit [202] captures the query selfie image (for example a selfie image) such that the captured image includes at least the human object and the query ID card image. However, the present disclosure is not limited thereto and in one other implementation the capturing unit [202] may capture images separately for capturing the query selfie image and the query ID card image. Furthermore, in an implementation the capturing unit [202] may be a part of a user device (for example a smartphone etc.) connected to the system [200] and the capturing unit [202] in such implementation may be connected with the system [200] via said user device. In another implementation, the capturing unit [202] may be a part of standalone system [200].

After capturing the query selfie image and the query ID card image, the capturing unit [202] may be configured to transmit the captured query selfie image and the query ID card image to the processing unit [204]. The processing unit [204] is connected at least to the capturing unit [202], wherein the processing unit [204] is configured to process the query selfie image and the query ID card image. In an implementation of the present invention, the processing unit [204] is configured to process the query selfie image and the query ID card image based on one or more processing techniques, wherein the one or more processing techniques comprise at least one of a face bounding box detection technique for face detection, a face fiducial point detection technique for face detection, and a cropping and aligning technique for face alignment.

Considering an example where a query selfie image is captured using a camera device connected to the system [200] or using the capturing unit [202], the processing unit [204] of the system [200] in such example may detects and crops one or more human faces in the query selfie image using a neural network-based rotation-invariant face detector. As users often upload/capture pictures that can be rotated at any angle and are of different sizes depending on the distance from the capturing unit [202], the related limitations of such scenarios are addressed using the rotation-invariant face detector. Therefore, the present invention encompasses use of the rotation-invariant face detector which may detect a face from a raw image say a query selfie image irrespective of an angle at which the human face(s) are present in the raw image. This overcomes limitation of false predictions from currently known face detectors due to bad face angles.

Further, in an implementation, if only one human face is detected in the query selfie image, the processing unit [204] via the rotation-invariant face detector may detect five fiducial points corresponding to the left eye, right eye, nose, left corner of the lips, and right corner of the lips along with a face bounding box. Also, if multiple human faces are detected in the captured selfie image, the largest face is chosen by the processing unit [204] based on an area of bounding boxes. In an implementation the face fiducial points of the largest face are used to align and crop the face in such a way that the line between eyes is horizontal and the face is rescaled to a fixed size. In an event the processing unit [204] also processes the captured query selfie image to warp the face such that the detected fiducial points fall as close as possible to predefined positions of the face crop. Also, in an event if no face is detected in the captured query selfie image the user may be prompted by the processing unit [204] to recapture a selfie.

Also, in a preferred implementation of the present invention, to process the query ID card image, the processing unit [204] is further configured to crop a region of interest (ROI) from the captured query ID card image via a convolutional neural network-based object detector, and align the region of interest to detect one or more text fields present on the query ID card image. Further, in another implementation of the present invention, the processing unit [204] is configured to detect the query ID card image in a captured image. In case no identification document (ID) is detected in the captured image, i.e., the query ID card image, the processing unit [204] generates and provides an indication to the user to recapture the ID card image again.

Further, in an exemplary implementation of the present invention, the processing of the query ID card image by the processing unit [204] further comprises detecting an ID card region of interest (ROI), cropping the region of interest (ROI) from the query ID card image via a convolutional neural network-based object detector, and aligning the region of interest to detect one or more text fields present on the query ID card image. Thus, the processing unit [204], after detecting and cropping the ID card ROI from the query ID card image, performs an ID ROI alignment by passing the cropped ID card ROI through a card aligner, which uses a text detector to detect one or more text fields present on the identification document/ID card ROI crop and rotates the ID card ROI crop such that the one or more text fields are horizontal, making the entire ID card ROI crop aligned. In an implementation of the present invention, the one or more text fields present on the query ID card image may be detected and extracted by the present invention from the query ID card image in a text form using one or more optical character recognition systems.

Further, the processing unit [204] as disclosed by the present invention is further configured to extract a query image face feature vector based on the processing of the query selfie image, and a query ID card image face feature vector and the query metadata based on the processing of the query ID card image.

Once the query selfie image and the query ID card image are processed, the processing unit [204] is then configured to extract the query image face feature vector and the query ID card image face feature vector based on the processing of the query selfie image and the query ID card image, respectively. In an implementation to determine the query image face feature vector, the query selfie image of the human object (i.e., the human object (e.g., a human face) in the query selfie image) may be passed through a face feature extractor convolutional network or deep convolutional network, where the query selfie image of the human object (i.e., RGB image) is first normalised and fed into an input layer of the deep convolutional network. The output of this layer is successively fed through many deep convolutional layers. The query selfie image of the human object reduces in dimension in each step till finally a single vector of 256 float values (i.e., the query image face feature vector) is obtained. This vector (i.e., the query image face feature vector) holds a compact representation of the input query selfie image of the human object, which can be compared with other such vectors later in the pipeline. Also, in an implementation to determine the query ID card image face feature vector, an image of the query ID card from a cropped and aligned query ID card image (i.e., from an ID ROI) is passed through the face feature extractor convolutional network. Thereafter, the image of the human object detected from the ID ROI (i.e., RGB image) is first normalised and fed into the input layer of the deep convolutional network. The output of this layer is successively fed through many layers of deep convolutional layers. The image of the human object detected from the ID ROI reduces in dimension in each step until finally a single vector of 256 float values (i.e., the query ID card face feature vector) is obtained. This vector (i.e., the query ID card image face feature vector) holds a compact representation of the input image of the human object detected from the ID ROI, which can be compared with other such vectors later in the pipeline.

Figure 4:
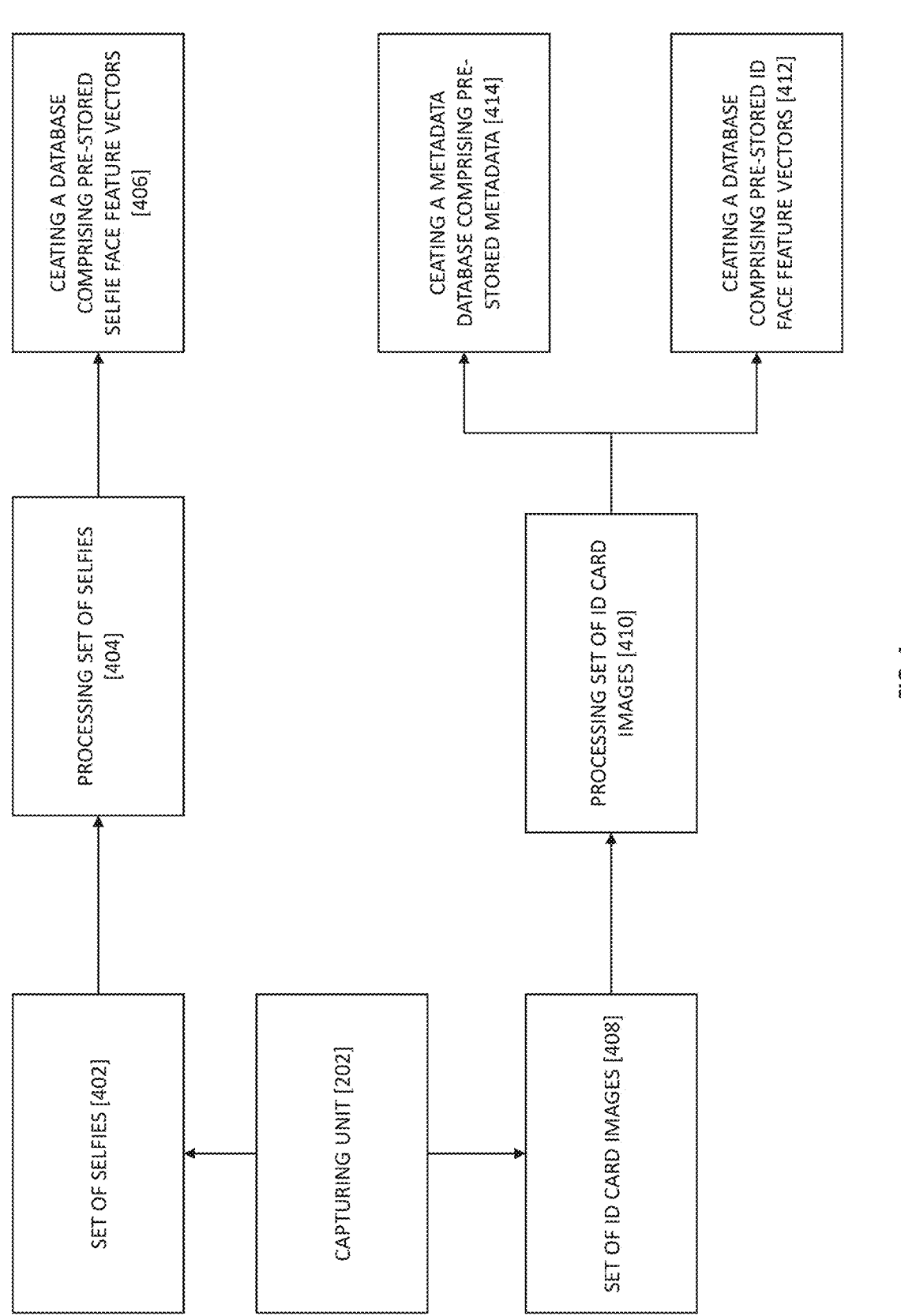
FIG. 4 indicates an exemplary diagram depicting various databases created in accordance with exemplary embodiments of the present invention.

Further, as disclosed by the present invention, the searching unit [206] is connected at least to the capturing unit [202] and the processing unit [204]. The searching unit [206] is configured to search a set of nearest neighbors of the query image face feature vector in a set of pre-stored selfie face feature vectors. Further, in an exemplary implementation of the present invention, a set of selfies of one or more persons may be processed to extract the set of pre-stored selfie face feature vectors. A database is then created based on the set of pre-stored selfie face feature vectors, as shown in FIG. 4 at [402], [404] and [406], wherein the FIG. 4 indicates an exemplary diagram depicting various databases created in accordance with exemplary embodiments of the present invention. Also, each pre-stored selfie face feature vector from the set of pre-stored selfie face feature vectors is further associated with an application ID. The application ID is further associated with a pre-stored ID face feature vector from a set of pre-stored ID face feature vectors and a corresponding pre-stored metadata of the pre-stored ID face feature vector. In an implementation of the present invention, the query image face feature vector extracted based on the processing of the query selfie image may be stored in a database along with the set of pre-stored selfie face feature vectors.

Further, the searching unit [206] is configured to search a set of nearest neighbors of the query ID card image face feature vector in the set of pre-stored ID face feature vectors. Further, as shown in FIG. 4 in an exemplary implementation of the present invention a set of ID card images of the one or more persons may be processed to extract the set of pre-stored ID face feature vectors. Also, a database is then created based on the set of pre-stored ID face feature vectors, as shown in FIG. 4 at [408], [410] and [412]. Also, each pre-stored ID face feature vector from the set of pre-stored ID face feature vectors is associated with a corresponding pre-stored metadata. Moreover, the pre-stored metadata corresponding to said each pre-stored ID face feature vector is determined based on a processing of a corresponding ID card image of said each pre-stored ID face feature vector from the set of ID card images using one or more metadata extraction techniques. In an implementation of the present invention, the query ID card image face feature vector extracted may be stored in the database along with the set of pre-stored ID face feature vectors. In an implementation of the present invention, the set of selfies and the set of ID card images are processed based on the one or more processing techniques.

Further, the person skilled in the art would appreciate that the one or more processing techniques used for processing can be a well-known technique or a novel technique, and it may comprise a combination of one or more well-known techniques or novel techniques. The disclosure does not intend to limit the scope of the processing techniques used, and the use of any suitable processing technique within the scope of the invention is contemplated.

In another implementation of the present invention, the extracted query image face feature vector may be assigned a selfie application ID. The extracted query ID card image face feature vector and the extracted query metadata may be assigned an ID card application ID. Further, in another implementation, the selfie application ID associated with the query image face feature vector and the ID card application ID associated with the query ID card image face feature vector and the extracted query metadata may be further stored in the database for search in order to detect a fraudulent action in the future. Furthermore, as shown in FIG. 4 at [414], in another exemplary implementation, a metadata database stores at least one of a metadata associated with the set of pre-stored selfie face feature vectors based on corresponding selfie application ID(s), and a metadata associated with the set of pre-stored ID face feature vectors based on corresponding ID card application ID(s).

Further, the searching unit [206] is configured to identify one or more candidate selfie face feature vectors in the set of pre-stored selfie face feature vectors based on the searching of the set of nearest neighbors of the query image face feature vector. Further, in a preferred implementation of the present invention, the searching unit [206] is further configured to identify the one or more candidate selfie face feature vectors based on a pre-defined decision threshold and a cosine distance between one or more nearest neighbors from the set of nearest neighbors of the query image face feature vector and the query image face feature vector.

Further, in an implementation of the present invention, Inverted File Index (IVF)-SQ8 approximate nearest neighbors technique may be used to train the database comprising the set of pre-stored selfie face feature vectors to produce an IVF-SQ8 indexed database of the set of pre-stored selfie face feature vectors where the vectors are approximated to INT8 datatype, which reduces the memory footprint to save the database, and the vectors in the database are clustered into many buckets using Inverted File Index (IVF) along with product quantization for a faster and more efficient database similarity search. Further, in an exemplary implementation to identify the one or more candidate selfie face feature vectors in the set of pre-stored selfie face feature vectors, the query image face feature vector is used to perform a similarity search on the IVF-SQ8 indexed database of the set of pre-stored selfie face feature vectors to firstly retrieve top nearest neighbors say 200 nearest neighbours to the query selfie face feature vector in the database. It should be noted that the specific number of nearest neighbors retrieved may vary according to the requirements of the present disclosure and should not be construed to restrict the scope of the disclosure. The method described in the patent specification may encompass variations in the number of nearest neighbors retrieved that fall within the scope of the disclosure.

Therefore, the retrieval of a specific number of nearest neighbors should not limit the scope of the disclosure. The person skilled in the art would appreciate that the retrieved top nearest neighbor(s) may vary according to the specific implementation of the method described.

Further, the search result from the IVF-SQ8 search may result in a cosine distance between the query image face feature vector and the set of pre-stored selfie face feature vectors. In an exemplary implementation, a cosine distance between the query image face feature vector and the set of pre-stored selfie face feature vectors is first computed. It would be appreciated by the person skilled in the art that in an exemplary implementation of the present disclosure, the calculated cosine distance may be an approximate value, and the same shall not be interpreted to limit the scope of the invention. Thereafter, to improve the accuracy of the search, real cosine distances are calculated between the query image face feature vector and its retrieved nearest neighbours and the real cosine distances then sorted in an increasing order. Further, in an implementation of the present invention, a pre-defined decision threshold may be implemented to further identify the one or more candidate selfie face feature vectors, such that if the one or more nearest neighbors in these 200 retrieved nearest neighbors have a cosine distance less than the pre-defined decision threshold, then that one or those nearest neighbors are identified as the one or more candidate selfie face feature vectors. If none of the one or nearest neighbors has a cosine distance less than the set decision threshold, no result is returned.

Further, the searching unit [206] is configured to identify one or more candidate ID face feature vectors in the set of pre-stored ID face feature vectors based on the searching of the set of nearest neighbors of the query ID card image face feature vector. Further, in a preferred implementation of the present invention, the searching unit [206] is further configured to identify the one or more candidate ID face feature vectors based on the pre-defined decision threshold and a cosine distance between one or more nearest neighbors from the set of nearest neighbors of the query ID card image face feature vector and the query ID card image face feature vector. In an implementation, the IVF-SQ8 approximate nearest neighbors technique is used to train the database of the set of pre-stored ID face feature vectors to produce an IVF-SQ8 indexed database of the set of pre-stored ID face feature vectors where the vectors are approximated to INT8 datatype, which reduces the memory footprint to save the database, and the vectors in the database are clustered into many buckets using Inverted File Index (IVF) along with product quantization for faster and more efficient database similarity search. Further, in an exemplary implementation to identify the one or more candidate ID face feature vectors in the set of pre-stored ID face feature vectors, the query ID card image face feature vector is used to perform a similarity search on the IVF-SQ8 indexed database of the set of pre-stored ID face feature vectors to retrieve top nearest neighbors say 200 nearest neighbors, to the query ID card image face feature vector in the database. The search result from the IVF-SQ8 search may result in a cosine distance between the query ID card image face feature vector and the set of pre-stored ID face feature vectors. In an exemplary implementation, a cosine distance between the query ID card image face feature vector and the set of pre-stored ID face feature vectors is first computed. Thereafter, to improve the accuracy of the search, the real cosine distances are calculated between the query ID card image face feature vector and the retrieved nearest neighbors, which are now sorted in an increasing order of the real cosine distances calculated.

Further, in an implementation of the present invention, a pre-defined decision threshold may be implemented to further identify the one or more candidate ID face feature vectors, such that if the one or more nearest neighbors in these 200 retrieved nearest neighbors have a cosine distance less than the pre-defined decision threshold, then that one or those nearest neighbors are identified as the one or more candidate ID face feature vectors. If none of the one or nearest neighbors has a cosine distance less than the set decision threshold, no result is returned.

Further, the searching unit [206] is configured to retrieve from the storage unit [210] a pre-stored selfie application ID associated with the one or more candidate selfie face feature vectors and a pre-stored ID card application ID associated with the one or more candidate ID face feature vectors. Further, the searching unit [206] is configured to retrieve from the metadata database a first pre-stored metadata associated with the one or more candidate selfie face feature vectors based on the pre-stored selfie application ID. Also, the searching unit [206] is configured to retrieve from the metadata database a second pre-stored metadata associated with the one or more candidate ID face feature vectors based on the pre-stored ID card application ID. It is to be noted that the retrieval of pre-stored metadata from the metadata database based on the pre-stored selfie application ID and pre-stored ID card application ID is not limiting in nature. The person skilled in the art would appreciate that the metadata database can include various types of metadata associated with the candidate selfie and ID face feature vectors, and the pre-stored metadata may be based on a variety of applications and sources. The techniques for retrieving and processing the pre-stored metadata may be well-known or novel and may include a combination of one or more techniques.

Further, the present system [200], as disclosed by the present invention, comprises the decision-making unit [208] connected at least to the capturing unit [202], the processing unit [204], and the searching unit [206]. The said decision-making unit [208] is configured to match the query metadata with at least one of the first pre-stored metadata and the second pre-stored metadata. Further, the decision-making unit [208] is further configured to match the query metadata with at least one of the first pre-stored metadata and the second pre-stored metadata based on a pre-defined matching threshold. It should be understood by those skilled in the art that the pre-defined matching threshold may vary depending on the specific application and requirements. The disclosed matching threshold is for illustrative purposes only and should not be interpreted as limiting the scope of the invention. Different thresholds, such as those based on statistical analysis or machine learning algorithms, may be used and are within the scope of the present invention.

Further, the decision-making unit [208] is configured to match the query metadata with at least one of the first pre-stored metadata and the second pre-stored metadata based on the match of at least one of: a name field from the query metadata with a name field from at least one of the first pre-stored metadata and the second pre-stored metadata, a date of birth from the query metadata with a date of birth from at least one of the first pre-stored metadata and the second pre-stored metadata, and a query ID number from the query metadata with a first ID number from at least one of the first pre-stored metadata and the second pre-stored metadata. Further, the person skilled in the art would appreciate that the list of metadata disclosed above is not exhaustive and is provided for exemplary purposes only. The list of metadata fields may vary depending on the specific implementation and application and may include any other relevant fields commonly used in metadata extraction techniques. Therefore, the present invention is not limited to the specific metadata fields disclosed herein, and any other relevant metadata field and metadata extraction technique may be incorporated into the present invention.

Further, the decision-making unit [208] is configured to generate one of a fraudulent indication and a non-fraudulent indication based on the matching of the query metadata with at least one of the first pre-stored metadata and the second pre-stored metadata. The non-fraudulent indication is generated based on a successful match of the query metadata with the first pre-stored metadata and the second pre-stored metadata, and the fraudulent indication is generated based on an unsuccessful match of the query metadata with at least one of the first pre-stored metadata and the second pre-stored metadata. Thereafter, the decision-making unit [208] is configured to detect the fraudulent action based on the fraudulent indication.

Further, in an implementation, the decision-making unit [208] may perform a fuzzy match to match the query metadata fields, such as the name field or the date of birth field, with the corresponding fields of at least one of the first pre-stored metadata and the second pre-stored metadata. If the match is not successful and there is a significant difference between values, the decision-making unit [208] may generate the fraudulent indication. A degree of match required to determine a successful match may be based on a pre-defined matching threshold, which may be one of a user-defined matching threshold, and a system [200]-defined matching threshold, and the pre-defined matching threshold may be a matching threshold for a particular field. Further, the fuzzy matching may involve the use of various techniques that may be obvious to a person skilled in the art to implement the features of the present disclosure. Overall, the implementation of fuzzy matching techniques may improve the accuracy of the fraud detection process by accounting for small discrepancies in the metadata fields.

Figure 3B:
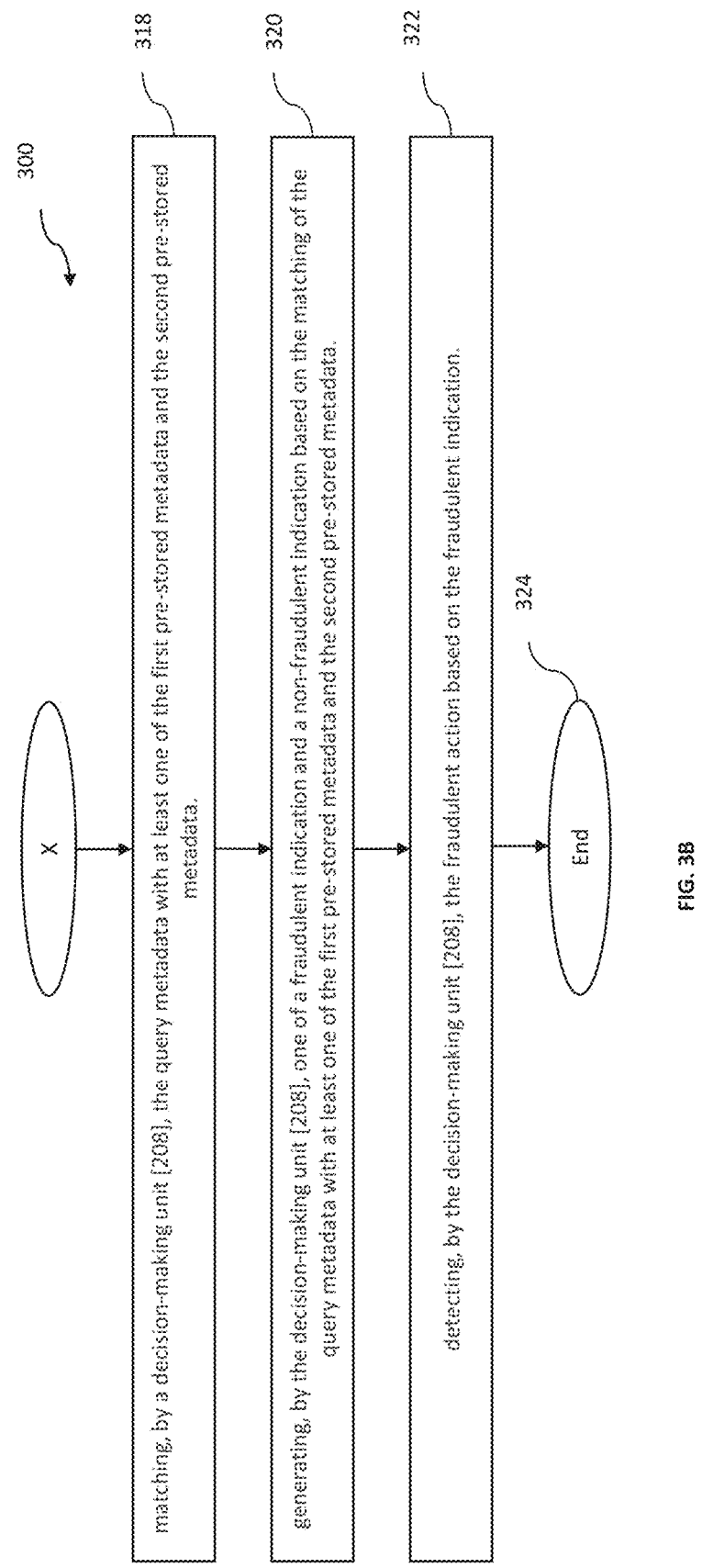

Referring now to FIG. 3A and FIG. 3B, that illustrates an exemplary method [300] flow diagram for detection of a fraudulent action in accordance with exemplary embodiments of the present invention. In an implementation the method [300] is performed by the system [200]. As shown in FIG. 3A, the method [300] begins at step 302. In an implementation the method [300] may begin upon receiving a request for authentication of an application for identity verification. In an event the system [200] may be implemented at a user device, and an authentication request may be received at the system [200] from an application such as a banking application, etc. In another event the system [200] may be implemented in a kiosk, and an authentication request may be received at the system [200] from a user via a user interface of the kiosk.

Next, at step [304], the method [300] encompasses capturing in real time, by a capturing unit [202], a query selfie image and a query ID card image, wherein the query selfie image comprises a human object, and the query ID card image comprises at least one of the human object and a query metadata. In an implementation of the present invention, the capturing unit [202] may be a part of the user device or the kiosk, or the capturing unit [202] may be in a wired and/or wireless connection with the user device or the kiosk, wherein the user device or the kiosk comprises a camera unit comprising at least one camera to capture the query selfie image and the query ID card image. For ease of understanding, let us consider an example wherein a user of a mobile device captures by the mobile device a selfie image and an image of an ID card of the user, i.e., the query selfie image and the query ID card image. The selfie image captured by the mobile device at least comprises a human object e.g., a face of the user, and the image of the ID card captured by the mobile device at least comprises the human object (e.g., the face of the user) and a query metadata such as name, date of birth, address, unique identification number, etc.

Also, in an implementation, the capturing unit [202] captures the query selfie image (for example a selfie image) such that the captured image includes at least the human object and the query ID card image. However, the present disclosure is not limited thereto and in one other implementation the capturing unit [202] may capture images separately for capturing the query selfie image and the query ID card image. Furthermore, in an implementation the capturing unit [202] may be a part of a user device (for example a smartphone etc.) connected to the system [200] and the capturing unit [202] in such implementation may be connected with the system [200] via said user device. In another implementation, the capturing unit [202] may be a part of standalone system [200].

Next, at step [306], the method [300] encompasses processing, by a processing unit [204], the query selfie image and the query ID card image, wherein processing, by the processing unit [204], the query selfie image and the query ID card image is based on one or more processing techniques, wherein the one or more processing technique comprises: at least one of a face bounding box detection technique for face detection, a face fiducial point detection technique for face detection, and a cropping and aligning technique for face alignment. Considering an example where a query selfie image is captured using a camera device connected to the system [200] or using the capturing unit [202], the processing unit [204] of the system [200] in such example may detects and crops one or more human faces in the query selfie image using a neural network-based rotation-invariant face detector. As users often upload/capture pictures that can be rotated at any angle and are of different sizes depending on the distance from the capturing unit [202], the related limitations of such scenarios are addressed using the rotation-invariant face detector. Therefore, the present invention encompasses use of the rotation-invariant face detector which may detect a face from a raw image say a query selfie image irrespective of an angle at which the human face(s) are present in the raw image. This overcomes limitation of false predictions from currently known face detectors due to bad face angles.

Further, in an implementation, if only one human face is detected in the query selfie image, the processing unit [204] via the rotation-invariant face detector may detect five fiducial points corresponding to the left eye, right eye, nose, left corner of the lips, and right corner of the lips along with a face bounding box. Also, if multiple human faces are detected in the captured selfie image, the largest face is chosen by the processing unit [204] based on an area of bounding boxes. In an implementation the face fiducial points of the largest face are used to align and crop the face in such a way that the line between eyes is horizontal and the face is rescaled to a fixed size. In an event the processing unit [204] also processes the captured query selfie image to warp the face such that the detected fiducial points fall as close as possible to predefined positions of the face crop. Also, in an event if no face is detected in the captured query selfie image the user may be prompted by the processing unit [204] to recapture a selfie.

In another exemplary implementation of the present invention, the processing, by the processing unit [204], the query ID card image further comprises cropping, by the processing unit [204], a region of interest (ROI) from the captured query ID card image via a convolutional neural network-based object detector, and aligning, by the processing unit [204], the region of interest to detect one or more text fields present on the query ID card image. Thus, the processing unit [204], after detecting and cropping the ID card ROI from the query ID card image, performs an ID ROI alignment by passing the cropped ID card ROI through a card aligner, which uses a text detector to detect one or more text fields present on the identification document/ID card ROI crop and rotates the ID card ROI crop such that the one or more text fields are horizontal, making the entire ID card ROI crop aligned. In an implementation of the present invention, the one or more text fields present on the query ID card image may be detected and extracted by the present invention from the query ID card image in a text form using one or more optical character recognition systems. Further, in another implementation of the present invention, the processing unit [204] detects the query ID card image in a captured image to implement the features of the present disclosure. In case no identification document (ID) is detected in the captured image, i.e., the query ID card image, the processing unit [204] generates and provides an indication to the user to recapture the ID card image again.

Next, at step [308], the method [300] comprises extracting, by the processing unit [204], a query image face feature vector based on the processing of the query selfie image, and a query ID card image face feature vector and the query metadata based on the processing of the query ID card image. Once the query selfie image and the query ID card image are processed, the processing unit [204] then extracts the query image face feature vector and the query ID card image face feature vector based on the processing of the query selfie image and the query ID card image, respectively. In an implementation to determine the query image face feature vector, the query selfie image of the human object may be passed through a face feature extractor convolutional network or deep convolutional network, where the query selfie image of the human object (i.e., RGB image) is first normalised and fed into an input layer of the deep convolutional network. The output of this layer is successively fed through many deep convolutional layers. The query selfie image of the human object reduces in dimension in each step till finally a single vector of 256 float values (i.e., the query image face feature vector) is obtained. This vector (i.e., the query image face feature vector) holds a compact representation of the input query selfie image of the human object, which can be compared with other such vectors later in the pipeline. Also, in an implementation to determine the query ID card image face feature vector, an image of the query ID card from a cropped and aligned query ID card image (i.e., from an ID ROI) is passed through the face feature extractor convolutional network. Thereafter, the image of the human object detected from the ID ROI (i.e., RGB image) is first normalised and fed into the input layer of the deep convolutional network. The output of this layer is successively fed through many layers of deep convolutional layers. The image of the human object detected from the ID ROI reduces in dimension in each step until finally a single vector of 256 float values (i.e., the query ID card face feature vector) is obtained. This vector (i.e., the query ID card image face feature vector) holds a compact representation of the input image of the human object detected from the ID ROI, which can be compared with other such vectors later in the pipeline.

Next, at step [310], the method [300] comprises searching, by a searching unit [206], a set of nearest neighbors of the query image face feature vector in a set of pre-stored selfie face feature vectors, wherein a set of selfies of one or more persons is processed to extract the set of pre-stored selfie face feature vectors as shown in FIG. 4. Also, each pre-stored selfie face feature vector from the set of pre-stored selfie face feature vectors is further associated with an application ID. The application ID is further associated with a pre-stored ID face feature vector from a set of pre-stored ID face feature vectors and a corresponding pre-stored metadata of the pre-stored ID face feature vector. In an implementation of the present invention, the query image face feature vector extracted based on the processing of the query selfie image may be stored in a database along with the set of pre-stored selfie face feature vectors. The method [300] further comprises searching, by a searching unit [206], a set of nearest neighbors of the query ID card image face feature vector in the set of pre-stored ID face feature vectors, wherein a set of ID card images of the one or more persons is processed to extract the set of pre-stored ID face feature vectors. Also, each pre-stored ID face feature vector from the set of pre-stored ID face feature vectors is associated with a corresponding pre-stored metadata. Moreover, the pre-stored metadata corresponding to said each pre-stored ID face feature vector is determined based on a processing of a corresponding ID card image of said each pre-stored ID face feature vector from the set of ID card images using one or more metadata extraction techniques. In an implementation of the present invention, the query ID card image face feature vector extracted may be stored in the database along with the set of pre-stored ID face feature vectors. In an implementation of the present invention, the set of selfies and the set of ID card images are processed based on the one or more processing techniques. Further, the person skilled in the art would appreciate that the one or more processing techniques used for processing can be a well-known technique or a novel technique, and it may comprise a combination of one or more well-known techniques or novel techniques. The disclosure does not intend to limit the scope of the processing techniques used, and the use of any suitable processing technique within the scope of the invention is contemplated.

In another implementation of the present invention, the extracted query image face feature vector may be assigned a selfie application ID. The extracted query ID card image face feature vector and the extracted query metadata may be assigned an ID card application ID. Further, in another implementation, the selfie application ID associated with the query image face feature vector and the ID card application ID associated with the query ID card image face feature vector and the extracted query metadata may be further stored in the database for search in order to detect a fraudulent action in the future. Furthermore, in another exemplary implementation, a metadata database stores at least one of a metadata associated with the set of pre-stored selfie face feature vectors based on corresponding selfie application ID(s), and a metadata associated with the set of pre-stored ID face feature vectors based on corresponding ID card application ID(s).

Next, at step [312], the method [300] comprises identifying, by the searching unit [206] one or more candidate selfie face feature vectors in the set of pre-stored selfie face feature vectors based on the searching of the set of nearest neighbors of the query image face feature vector. Further, as disclosed by the present disclosure, the identifying, by the searching unit [206], the one or more candidate selfie face feature vectors is further based on a pre-defined decision threshold and a cosine distance between one or more nearest neighbors from the set of nearest neighbors of the query image face feature vector and the query image face feature vector.

Further, in an exemplary implementation of the present invention, Inverted File Index (IVF)-SQ8 approximate nearest neighbors technique may be used to train the database comprising the set of pre-stored selfie face feature vectors to produce an IVF-SQ8 indexed database of the set of pre-stored selfie face feature vectors where the vectors are approximated to INT8 datatype, which reduces the memory footprint to save the database, and the vectors in the database are clustered into many buckets using Inverted File Index (IVF) along with product quantization for a faster and more efficient database similarity search. Further, in an exemplary implementation to identify the one or more candidate selfie face feature vectors in the set of pre-stored selfie face feature vectors, the query image face feature vector is used to perform a similarity search on the IVF-SQ8 indexed database of the set of pre-stored selfie face feature vectors to firstly retrieve top nearest neighbors say 200 nearest neighbours to the query selfie face feature vector in the database. The search result from the IVF-SQ8 search may result in a cosine distance between the query image face feature vector and the set of pre-stored selfie face feature vectors. In an exemplary implementation, a cosine distance between the query image face feature vector and the set of pre-stored selfie face feature vectors is first computed. Thereafter, to improve the accuracy of the search, real cosine distances are calculated between the query image face feature vector and its retrieved nearest neighbours and the real cosine distances then sorted in the increasing order. Further, in an implementation of the present invention, a pre-defined decision threshold may be implemented to further identify the one or more candidate selfie face feature vectors, such that if the one or more nearest neighbors in these 200 retrieved nearest neighbors have a cosine distance less than the pre-defined decision threshold, then that one or those nearest neighbors are identified as the one or more candidate selfie face feature vectors. If none of the one or nearest neighbors has a cosine distance less than the set decision threshold, no result is returned.

Also, at step [312] the method [300] as disclosed by the present disclosure further comprises identifying, by the searching unit [206] one or more candidate ID face feature vectors in the set of pre-stored ID face feature vectors based on the searching of the set of nearest neighbors of the query ID card image face feature vector. As disclosed by the present disclosure the identifying, the one or more candidate ID face feature vectors is further based on the pre-defined decision threshold and a cosine distance between one or more nearest neighbors from the set of nearest neighbors of the query ID card image face feature vector and the query ID card image face feature vector. In an implementation, the IVF-SQ8 approximate nearest neighbors technique is used to train the database of the set of pre-stored ID face feature vectors to produce an IVF-SQ8 indexed database of the set of pre-stored ID face feature vectors where the vectors are approximated to INT8 datatype, which reduces the memory footprint to save the database, and the vectors in the database are clustered into many buckets using Inverted File Index (IVF) along with product quantization for faster and more efficient database similarity search. Further, in an exemplary implementation to identify the one or more candidate ID face feature vectors in the set of pre-stored ID face feature vectors, the query ID card image face feature vector is used to perform a similarity search on the IVF-SQ8 indexed database of the set of pre-stored ID face feature vectors to retrieve top nearest neighbors say 200 nearest neighbors to the query ID card image face feature vector in the database. The search result from the IVF-SQ8 search may result in a cosine distance between the query ID card image face feature vector and the set of pre-stored ID face feature vectors. In an exemplary implementation, a cosine distance between the query ID card image face feature vector and the set of pre-stored ID face feature vectors is first computed. Thereafter, to improve the accuracy of the search, the real cosine distances are calculated between the query ID card image face feature vector and the retrieved nearest neighbors, which are now sorted in an increasing order of the real cosine distances calculated. Further, in an implementation of the present invention, a pre-defined decision threshold may be implemented to further identify the one or more candidate ID face feature vectors, such that if the one or more nearest neighbors in these 200 retrieved nearest neighbors have a cosine distance less than the pre-defined decision threshold, then that one or those nearest neighbors are identified as the one or more candidate ID face feature vectors. If none of the one or nearest neighbors has a cosine distance less than the set decision threshold, no result is returned.

Next, at step [314], the method [300] comprises retrieving, by the searching unit [206] from a storage unit [210], a pre-stored selfie application ID associated with the one or more candidate selfie face feature vectors, and a pre-stored ID card application ID associated with the one or more candidate ID face feature vectors.

Next, at step [316], the method [300] comprises retrieving, by the searching unit [206] from the metadata database, a first pre-stored metadata associated with the one or more candidate selfie face feature vectors based on the pre-stored selfie application ID, and a second pre-stored metadata associated with the one or more candidate ID face feature vectors based on the pre-stored ID card application ID.

Also, as shown in FIG. 3B, next, at step [318], the method [300] comprises matching, by a decision-making unit [208], the query metadata with at least one of the first pre-stored metadata and the second pre-stored metadata. The step of matching, by the decision-making unit [208], the query metadata with at least one of the first pre-stored metadata and the second pre-stored metadata is further based on a pre-defined matching threshold. It should be understood by those skilled in the art that the pre-defined matching threshold may vary depending on the specific application and requirements. The disclosed matching threshold is for illustrative purposes only and should not be interpreted as limiting the scope of the invention. Different thresholds, such as those based on statistical analysis or machine learning algorithms, may be used and are within the scope of the present invention.

In an implementation of the present disclosure, the step of matching, by the decision-making unit [208], the query metadata with at least one of the first pre-stored metadata and the second pre-stored metadata is further based on matching of at least one of: a name field from the query metadata with a name field from at least one of the first pre-stored metadata and the second pre-stored metadata, a date of birth from the query metadata with a date of birth from at least one of the first pre-stored metadata and the second pre-stored metadata, and a query ID number from the query metadata with a first ID number from at least one of the first pre-stored metadata and the second pre-stored metadata. Further, the person skilled in the art would appreciate that the list of metadata disclosed above is not exhaustive and is provided for exemplary purposes only. The list of metadata fields may vary depending on the specific implementation and application and may include any other relevant fields commonly used in metadata extraction techniques. Therefore, the present invention is not limited to the specific metadata fields disclosed herein, and any other relevant metadata field and metadata extraction technique may be incorporated into the present invention.

Next, at step [320], the method [300] comprises generating, by the decision-making unit [208], one of a fraudulent indication and a non-fraudulent indication based on the matching of the query metadata with at least one of the first pre-stored metadata and the second pre-stored metadata. The non-fraudulent indication is generated based on a successful matching of the query metadata with the first pre-stored metadata and the second pre-stored metadata, and the fraudulent indication is generated based on an unsuccessful matching of the query metadata with at least one of the first pre-stored metadata and the second pre-stored metadata.

Next, at step [322], the method [300] thereafter encompasses detecting, by the decision-making unit [208], the fraudulent action based on the fraudulent indication.

Further, in an implementation of the present method [300] as disclosed by the present invention, the decision-making unit [208] may perform a fuzzy match to match the query metadata fields, such as the name field or the date of birth field, with the corresponding fields of at least one of the first pre-stored metadata and the second pre-stored metadata. If the match is not successful and there is a significant difference between values, the decision-making unit [208] may generate the fraudulent indication. A degree of match required to determine a successful match may be based on a pre-defined matching threshold, which may be one of a user-defined matching threshold, and a system [200]-defined matching threshold, and the pre-defined matching threshold may be a matching threshold for a particular field. Further, the fuzzy matching may involve the use of various techniques that may be obvious to a person skilled in the art to implement the features of the present disclosure. Overall, the implementation of fuzzy matching techniques may improve the accuracy of the fraud detection process by accounting for small discrepancies in the metadata fields.

Thereafter, the method [300] terminates at step [324].

Also, an aspect of the present disclosure relates to a non-transitory computer readable storage medium storing instructions for detection of a fraudulent action, the storage medium comprising executable code which, when executed by a processor, causes the processor to: enable a capturing unit to capture a query selfie image and a query ID card image, wherein the query selfie image comprises a human object, and the query ID card image comprises at least one of the human object and a query metadata; process the query selfie image and the query ID card image; extract a query image face feature vector based on the processing of the query selfie image, and a query ID card image face feature vector and the query metadata based on the processing of the query ID card image; enable a searching unit to: 1) search a set of nearest neighbors of the query image face feature vector in a set of pre-stored selfie face feature vectors, and a set of nearest neighbors of the query ID card image face feature vector in a set of pre-stored ID face feature vectors, 2) identify one or more candidate selfie face feature vectors in the set of pre-stored selfie face feature vectors based on the searching of the set of nearest neighbors of the query image face feature vector, 3) identify one or more candidate ID face feature vectors in the set of pre-stored ID face feature vectors based on the searching of the set of nearest neighbors of the query ID card image face feature vector, 4) retrieve from a storage unit, a pre-stored selfie application ID associated with the one or more candidate selfie face feature vectors, and a pre-stored ID card application ID associated with the one or more candidate ID face feature vectors, 5) retrieve from a metadata database a first pre-stored metadata associated with the one or more candidate selfie face feature vectors based on the pre-stored selfie application ID, and 6) retrieve from the metadata database a second pre-stored metadata associated with the one or more candidate ID face feature vectors based on the pre-stored ID card application ID; and enable a decision making unit to: 1) match the query metadata with at least one of the first pre-stored metadata and the second pre-stored metadata, 2) generate one of a fraudulent indication and a non-fraudulent indication based on the matching of the query metadata with at least one of the first pre-stored metadata and the second pre-stored metadata, and 3) detect the fraudulent action based on the fraudulent indication.

The technical solutions in the present disclosure propose novel techniques for a system [200] and method [300] for detection of a fraudulent action based on a selfie image comprising a human object and an image of an identification document of the human object. Also, as the technical solutions disclosed in the present disclosure are based on verifying the human object present in the selfie and/or the ID image with at least prestored details related to image(s) of: one more human objects and identification document(s) of the one or more human objects, said technical solutions provides a technical effect and technical advancement over the existing solutions of fraud detection. The technical solution of the present disclosure also provide a technical advancement over the currently known solutions at least as: firstly, it provides a novel and efficient method [300] and system [200] for identity verification that captures identity card(s) and selfie of user(s) in real time and extracts details such as facial details etc. from captured images in real time. Secondly, it includes efficient enrollment of human faces detected from images of ID cards (say ID card faces) into a database, which was absent in existing solutions. Thirdly, it allows searching for ID card faces from an ID database, which is necessary to provide detection of a fraudulent action in an efficient manner. Fourthly, the technical solution as disclosed in the present disclosure extracts and uses a metadata from ID cards to check for suspicious re-entries in the database. Fifthly, it performs both selfie face based retrieval and ID card face based retrieval of details and combines the results to arrive at a final decision, which was not done by any existing solution. Lastly, the technical solution as disclosed in the present invention uses a metadata information to predict suspicious cases in face search-based systems, which was not utilized by any existing solution. These technical effects make the present invention more efficient and accurate in identifying and preventing fraudulent activities, providing a more secure environment for the users. Further, the present invention provides a novel method [300] and system [200] for performing thorough identity verification by capturing identity cards and extracting facial biometrics for matching it with a pre-stored data. The technical effect of the present invention is to provide a more reliable and accurate identity verification system [200] by combining selfie face-based data retrieval and ID card face-based data retrieval, and using extracted metadata fields like name, date of birth, and card number to predict suspicious entries or impersonation attempts. Further, the present invention overcomes existing drawbacks of existing solutions by including ID card faces in the database, searching for ID card faces from an ID database, and extracting metadata from ID cards for further verification.

The present invention also provides a novel decision-making unit [208] to generate a fraudulent or non-fraudulent indication based on a matching of a query metadata with a pre-stored metadata, and to detect fraudulent actions based on the fraudulent indication. Overall, the present invention provides a more comprehensive and effective solution for identity verification using face search-based systems.

Also, the technical solutions of the present disclosure have use cases in at least the following:

1. Identity verification for Subscriber Identity Module (SIM) card issuance by telecom companies,
2. Identity verification for contactless and remote loan issuance,
3. Identity verification for the issuance of life certificates for pensioners remotely,
4. Identity verification for the issuance of life or health insurance,
5. Identity verification during virtual video verification for customer onboarding to a multitude of financial services, and
6. Identity verification for customer onboarding for a trading account etc.

While the invention has been explained with respect to many examples, it will be appreciated by those skilled in the art that the invention is not restricted by these examples and that many changes can be made to the embodiments disclosed herein without departing from the principles and scope of the present invention.

We claim:

1. A method for detection of a fraudulent action, the method comprising:

capturing in real time, by a capturing unit, a query selfie image and a query ID card image, wherein the query selfie image comprises a human object, and the query ID card image comprises at least one of the human object and a query metadata;

processing, by a processing unit, the query selfie image and the query ID card image;

extracting, by the processing unit, a query image face feature vector based on the processing of the query selfie image, and a query ID card image face feature vector and the query metadata based on the processing of the query ID card image;

searching, by a searching unit, a set of nearest neighbors of the query image face feature vector in a set of pre-stored selfie face feature vectors, and a set of nearest neighbors of the query ID card image face feature vector in a set of pre-stored ID face feature vectors;

identifying, by the searching unit:

one or more candidate selfie face feature vectors in the set of pre-stored selfie face feature vectors based on the searching of the set of nearest neighbors of the query image face feature vector, and one or more candidate ID face feature vectors in the set of pre-stored ID face feature vectors based on the searching of the set of nearest neighbors of the query ID card image face feature vector;

retrieving, by the searching unit from a storage unit, a pre-stored selfie application ID associated with the one or more candidate selfie face feature vectors, and a pre-stored ID card application ID associated with the one or more candidate ID face feature vectors;

retrieving, by the searching unit from a metadata database,

24 a first pre-stored metadata associated with the one or more candidate selfie face feature vectors based on the pre-stored selfie application ID, and a second pre-stored metadata associated with the one or more candidate ID face feature vectors based on the pre-stored ID card application ID;

matching, by a decision-making unit, the query metadata with at least one of the first pre-stored metadata and the second pre-stored metadata;

generating, by the decision-making unit, one of a fraudulent indication and a non-fraudulent indication based on the matching of the query metadata with at least one of the first pre-stored metadata and the second pre-stored metadata; and detecting, by the decision-making unit, the fraudulent action based on the fraudulent indication.

2. The method as claimed in claim 1, wherein the processing, by the processing unit, the query selfie image and the query ID card image is based on one or more processing techniques, wherein the one or more processing technique comprises: at least one of a face bounding box detection technique for face detection, a face fiducial point detection technique for face detection, and a cropping and aligning technique for face alignment.

3. The method as claimed in claim 2, wherein the processing, by the processing unit, the query ID card image further comprises:

cropping, by the processing unit, a region of interest from the captured query ID card image via a convolutional neural network-based object detector, and aligning, by the processing unit, the region of interest to detect one or more text fields present on the query ID card image.

4. The method as claimed in claim 1, wherein the identifying, by the searching unit, the one or more candidate selfie face feature vectors is further based on a pre-defined decision threshold and a cosine distance between one or more nearest neighbors from the set of nearest neighbors of the query image face feature vector and the query image face feature vector.

5. The method as claimed in claim 1, wherein the identifying, the one or more candidate ID face feature vectors is further based on the pre-defined decision threshold and a cosine distance between one or more nearest neighbors from the set of nearest neighbors of the query ID card image face feature vector and the query ID card image face feature vector.

6. The method as claimed in claim 1, wherein the matching, by the decision-making unit, the query metadata with at least one of the first pre-stored metadata and the second pre-stored metadata is further based on a pre-defined matching threshold.

7. The method as claimed in claim 1, wherein the matching, by the decision-making unit, the query metadata with at least one of the first pre-stored metadata and the second pre-stored metadata is further based on matching at least one of:

a name field from the query metadata with a name field from at least one of the first pre-stored metadata and the second pre-stored metadata, a date of birth from the query metadata with a date of birth from at least one of the first pre-stored metadata and the second pre-stored metadata, and a query ID number from the query metadata with a first ID number from at least one of the first pre-stored metadata and the second pre-stored metadata.

8. The method as claimed in claim 1, wherein the non-fraudulent indication is generated based on a successful matching of the query metadata with the first pre-stored metadata and the second pre-stored metadata, and the fraudulent indication is generated based on an unsuccessful matching of the query metadata with at least one of the first pre-stored metadata and the second pre-stored metadata.

9. The method as claimed in claim 1, wherein:

the set of pre-stored selfie face feature vectors is extracted based on a processing of a set of selfies of one or more persons, and the set of pre-stored ID face feature vectors is extracted based on a processing of a set of ID card images of the one or more persons.

10. The method as claimed in claim 9, wherein the processing of the set of selfies and the set of ID card images is based on the one or more processing techniques.

11. The method as claimed in claim 1, wherein each pre-stored ID face feature vector from the set of pre-stored ID face feature vectors is associated with a corresponding pre-stored metadata.

12. The method as claimed in claim 11, wherein the pre-stored metadata corresponding to said each pre-stored ID face feature vector is determined based on a processing of a corresponding ID card image of said each pre-stored ID face feature vector from the set of ID card images using one or more metadata extraction techniques.

13. The method as claimed in claim 1, wherein each pre-stored selfie face feature vector from the set of pre-stored selfie face feature vectors is further associated with an application ID.

14. The method as claimed in claim 13, wherein the application ID is further associated with a pre-stored ID face feature vector from the set of pre-stored ID face feature vectors and a corresponding pre-stored metadata of the pre-stored ID face feature vector.

15. A system for detection of a fraudulent action, the system comprises:

a capturing unit, configured to capture a query selfie image and a query ID card image, wherein the query selfie image comprises a human object, and the query ID card image comprises at least one of the human object and a query metadata;

a processing unit connected at least to the capturing unit, wherein the processing unit is configured to:

process the query selfie image and the query ID card image, and extract a query image face feature vector based on the processing of the query selfie image, and a query ID card image face feature vector and the query metadata based on the processing of the query ID card image;

a searching unit connected at least to the capturing unit and the processing unit, wherein the searching unit is configured to:

search a set of nearest neighbors of the query image face feature vector in a set of pre-stored selfie face feature vectors, and a set of nearest neighbors of the query ID card image face feature vector in a set of pre-stored ID face feature vectors, identify one or more candidate selfie face feature vectors in the set of pre-stored selfie face feature vectors based on the searching of the set of nearest neighbors of the query image face feature vector, identify one or more candidate ID face feature vectors in the set of pre-stored ID face feature vectors based on the searching of the set of nearest neighbors of the query ID card image face feature vector, retrieve from a storage unit, a pre-stored selfie application ID associated with the one or more candidate selfie face feature vectors, and a pre-stored ID card application ID associated with the one or more candidate ID face feature vectors, retrieve from a metadata database a first pre-stored metadata associated with the one or more candidate selfie face feature vectors based on the pre-stored selfie application ID, and retrieve from the metadata database a second pre-stored metadata associated with the one or more candidate ID face feature vectors based on the pre-stored ID card application ID; and a decision-making unit connected at least to the capturing unit, the processing unit, and the searching unit, wherein the decision-making unit is configured to:

match the query metadata with at least one of the first pre-stored metadata and the second pre-stored metadata, generate one of a fraudulent indication and a non-fraudulent indication based on the matching of the query metadata with at least one of the first pre-stored metadata and the second pre-stored metadata, and detect the fraudulent action based on the fraudulent indication.

16. The system as claimed in claim 15, wherein the processing unit is configured to process the query selfie image and the query ID card image based on one or more processing techniques, wherein the one or more processing technique comprises: at least one of a face bounding box detection technique for face detection, a face fiducial point detection technique for face detection, and a cropping and aligning technique for face alignment.

17. The system as claimed in claim 16, wherein to process the query ID card image, the processing unit is further configured to:

crop a region of interest from the captured query ID card image via a convolutional neural network-based object detector, and align the region of interest to detect one or more text fields present on the query ID card image.

18. The system as claimed in claim 15, wherein the searching unit is further configured to identify the one or more candidate selfie face feature vectors based on a pre-defined decision threshold and a cosine distance between one or more nearest neighbors from the set of nearest neighbors of the query image face feature vector and the query image face feature vector.

19. The system as claimed in claim 15, wherein the searching unit is further configured to identify the one or more candidate ID face feature vectors based on the pre-defined decision threshold and a cosine distance between one or more nearest neighbors from the set of nearest neighbors of the query ID card image face feature vector and the query ID card image face feature vector.

20. The system as claimed in claim 15, wherein the decision-making unit is further configured to match the query metadata with at least one of the first pre-stored metadata and the second pre-stored metadata based on a pre-defined matching threshold.

21. The system as claimed in claim 15, wherein the decision-making unit is further configured to match the query metadata with at least one of the first pre-stored metadata and the second pre-stored metadata is further based on a match of at least one of:

a name field from the query metadata with a name field from at least one of the first pre-stored metadata and the second pre-stored metadata, a date of birth from the query metadata with a date of birth from at least one of the first pre-stored metadata and the second pre-stored metadata, and a query ID number from the query metadata with a first ID number from at least one of the first pre-stored metadata and the second pre-stored metadata.

22. The system as claimed in claim 15, wherein the non-fraudulent indication is generated based on a successful match of the query metadata with the first pre-stored metadata and the second pre-stored metadata, and the fraudulent indication is generated based on an unsuccessful match of the query metadata with at least one of the first pre-stored metadata and the second pre-stored metadata.

23. The system as claimed in claim 15, wherein:

the set of pre-stored selfie face feature vectors is extracted based on a processing of a set of selfies of one or more persons, and the set of pre-stored ID face feature vectors is extracted based on a processing of a set of ID card images of the one or more persons.

24. The system as claimed in claim 23, wherein the set of selfies and the set of ID card images is processed based on the one or more processing techniques.

25. The system as claimed in claim 15, wherein each pre-stored ID face feature vector from the set of pre-stored ID face feature vectors is associated with a corresponding pre-stored metadata.

26. The system as claimed in claim 25, wherein the pre-stored metadata corresponding to said each pre-stored ID face feature vector is determined based on a processing of a corresponding ID card image of said each pre-stored ID face feature vector from the set of ID card images using one or more metadata extraction techniques.

27. The system as claimed in claim 15, wherein each pre-stored selfie face feature vector from the set of pre-stored selfie face feature vectors is further associated with an application ID.

28. The system as claimed in claim 27, wherein the application ID is further associated with a pre-stored ID face feature vector from the set of pre-stored ID face feature vectors and a corresponding pre-stored metadata of the pre-stored ID face feature vector.

29. A non-transitory computer readable storage medium storing instructions for detection of a fraudulent action, the storage medium comprising executable code which, when executed by a processor, causes the processor to:

enable a capturing unit to capture a query selfie image and a query ID card image, wherein the query selfie image comprises a human object, and the query ID card image comprises at least one of the human object and a query metadata;

process the query selfie image and the query ID card image;

extract a query image face feature vector based on the processing of the query selfie image, and a query ID card image face feature vector and the query metadata based on the processing of the query ID card image;

enable a searching unit to:

search a set of nearest neighbors of the query image face feature vector in a set of pre-stored selfie face feature vectors, and a set of nearest neighbors of the query ID card image face feature vector in a set of pre-stored ID face feature vectors, identify one or more candidate selfie face feature vectors in the set of pre-stored selfie face feature vectors based on the searching of the set of nearest neighbors of the query image face feature vector, identify one or more candidate ID face feature vectors in the set of pre-stored ID face feature vectors based on the searching of the set of nearest neighbors of the query ID card image face feature vector, retrieve from a storage unit, a pre-stored selfie application ID associated with the one or more candidate selfie face feature vectors, and a pre-stored ID card application ID associated with the one or more candidate ID face feature vectors, retrieve from a metadata database a first pre-stored metadata associated with the one or more candidate selfie face feature vectors based on the pre-stored selfie application ID, and retrieve from the metadata database a second pre-stored metadata associated with the one or more candidate ID face feature vectors based on the pre-stored ID card application ID; and enable a decision making unit to:

match the query metadata with at least one of the first pre-stored metadata and the second pre-stored metadata, generate one of a fraudulent indication and a non-fraudulent indication based on the matching of the query metadata with at least one of the first pre-stored metadata and the second pre-stored metadata, and detect the fraudulent action based on the fraudulent indication.

* * * * *